United States Patent [19]

Zebo

[11] 4,405,840

[45] Sep. 20, 1983

[54] ECHO CANCELER FAR END ENERGY DISCRIMINATOR

[75] Inventor: Timothy J. Zebo, Marlboro, N.J.

[73] Assignee: Bell Telephone Laboratories, Incorporated, Murray Hill, N.J.

[21] Appl. No.: 240,979

[22] Filed: Mar. 5, 1981

[51] Int. Cl.$^3$ ............ H04B 3/24

[52] U.S. Cl. ............ 179/170.2

[58] Field of Search ............ 179/1 P, 1 MN, 1 VC, 179/84 VF, 170.2, 170.6, 170.8; 324/77 R, 77 B; 364/724

[56] References Cited

U.S. PATENT DOCUMENTS

| | | | |
|---|---|---|---|
| 3,499,999 | 3/1970 | Sondhi | 179/170.2 |
| 3,500,000 | 3/1970 | Kelly et al. | 179/170.2 |
| 4,028,496 | 6/1977 | LaMarche et al. | 179/1 SA |
| 4,028,506 | 6/1977 | Araseki et al. | 179/170.2 |
| 4,072,830 | 2/1978 | Gitlin et al. | 179/170.2 |
| 4,129,753 | 12/1978 | Duttweiler | 179/170.2 |

OTHER PUBLICATIONS

D. Duttweiler; IEEE Spectrum; "Bell's Echo-Killer Chip"; Oct. 1980, pp. 34-37.

J. Otterman; IRE Transactions on Automatic Control; "The Properties and Methods for Computation of Exponentially-Mapped-Past Statistical Variables"; Jan. 1960; pp. 11-17.

*Primary Examiner*—G. Z. Rubinson

*Assistant Examiner*—Randall P. Myers

*Attorney, Agent, or Firm*—Thomas Stafford

[57] ABSTRACT

Energy in a received signal is distinguished as being whole band energy or partial band energy by comparing an average value of the received signal to a modified magnitude value of the received signal. When the modified magnitude value exceeds the average value, the received signal includes whole band energy, otherwise the received signal includes only partial band energy. This technique is employed in an echo canceler to enable updating an echo path estimate during intervals that the received signal includes whole band energy and to inhibit updating of the echo estimate being generated when the received signal includes only partial band energy

10 Claims, 4 Drawing Figures

ECHO CANCELER
ECHO ESTIMATOR
ADJUSTMENT NETWORK
ADJUSTMENT NETWORK
HYBRID
Z
SUM
COMBINING NETWORK
DELAY
DELAY
DELAY
GATE
ADAPT
ENERGY DISCRIMINATOR
SPEECH DETECTOR
X(K)
X(K-1)
X(K-N)
E(K)

WHOLE BAND ENERGY (WBE) ≡ (EMP > TH)·(MOD MAG > EMP)

ECHO CANCELER FAR END ENERGY DISCRIMINATOR

RELATED APPLICATIONS

Copending applications Ser. No. 240,977 and Ser. No. 240,978 were filed concurrently herewith.

TECHNICAL FIELD

This invention relates to cancellation of echoes in a two way communication system.

BACKGROUND OF THE INVENTION

Echoes commonly occur because of imperfect coupling of incoming signals at 4-to-2 wire junctions in communications systems. The echoes typically result because of imperfect impedance matching to the 2-wire facility in the 4-to-2 wire junction causing the incoming signal to be partially reflected over an outgoing path to the source of incoming signals.

Self-adapting echo cancelers have been employed to mitigate the echoes by generating an estimate of the reflected signal or echo and subtracting it from the outgoing signal. The echo estimate is updated in response to the outgoing signal for more closely approximating the echo to be cancelled. Heretofore, the updating of the echo estimate has been inhibited when near end speech signals are being transmitted or when no significant far end energy is being received. However, the echo estimate was allowed to be updated when any significant far end energy was being received, whether it was speech, noise, single frequency tones, multifrequency tones or the like.

It has been determined that allowing the canceler to update the echo estimate during intervals that the received far end signal includes energy occupying only a portion of a frequency band of interest, for example, a single frequency tone, multifrequency tone or the like (hereinafter designated partial band energy), results in an undesirable condition of the communications circuit including the canceler. Specifically, the canceler includes a self-adapting processor which can adjust to a large number of transfer functions in order to generate the echo estimate which best approximates the echo. A problem with allowing the processor to adjust the transfer function when partial band energy is being received is that although the transfer function arrived at is optimized for the frequency components of the partial band energy it may not be optimum for the remaining frequency components in the frequency band of interest, for example, the voice band. Indeed, the transfer function adjusted to at frequencies other than those in the partial band energy may be significantly different from the desired optimum adjustment which would be obtained when adjusting on a whole band signal, i.e., speech or Gaussian noise. Consequently, a so-called low return loss path is established at frequencies other than the partial band energy. This low return loss can lead to oscillations in the communications circuit. These oscillations are extremely undesirable and must be avoided.

The problem of low return loss and other problems of prior echo canceler arrangements resulting from allowing the canceler to adjust the echo estimate during intervals that partial band far end energy is being received are overcome by inhibiting the canceler from adjusting the echo estimate when partial band energy is being received as disclosed in copending U.S. patent application Ser. No. 240,977 filed concurrently herewith. The received energy is discriminated as being partial band or whole band and the echo canceler is enabled to adjust the echo estimate only when whole band energy is being received. That is to say, the echo estimate is enabled to be adjusted during intervals that significant far end energy is being received and the energy is determined not to be partial band and, therefore, is defined as being whole band. The apparatus employed to discriminate between partial band and whole band energy as disclosed in the application Ser. No. 240,977 is sophisticated and presently would require a substantial area of an integrated chip, if not, several chips.

SUMMARY OF THE INVENTION

These and other problems are overcome in an echo canceler far end energy discriminator in distinguishing between whole band energy and partial band energy in a received far end signal by comparing a signal representative of an average value of the received signal to a signal representative of a modified magnitude value of the received signal. When the modified magnitude of the received signal exceeds the average value, the received signal includes whole band energy and updating of the echo estimate is enabled. When the modified magnitude does not exceed the average, the received signal includes only partial band energy and updating of the echo estimate is inhibited.

In a specific embodiment, the exponentially mapped past (EMP) average is employed.

BRIEF DESCRIPTION OF THE DRAWING

The invention will be more fully understood from the following detailed description of an illustrative embodiment taken in connection with the appended figures in which.

DETAILED DESCRIPTION

Figure 1:
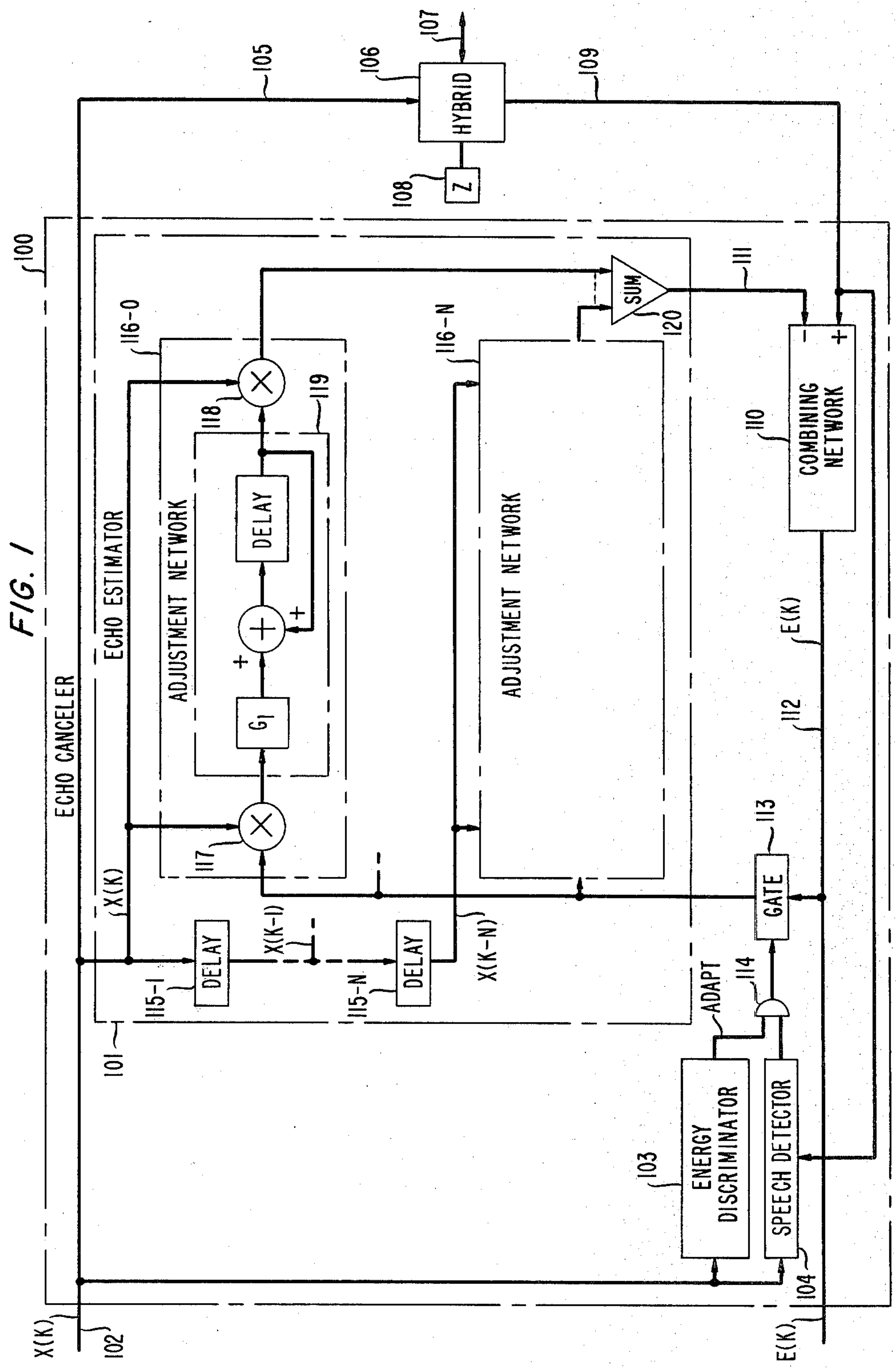
FIG. 1 shows in simplified block diagram form an echo canceler including an embodiment of the invention.

Echo canceler 100 including an embodiment of the invention is shown in simplified block diagram form in FIG. 1. Echo canceler 100 is broadly similar to echo cancelers disclosed in U.S. Pat. Nos. 3,499,999 and 3,500,000. Also see an article entitled "Bell's Echo-Killer Chip", *IEEE Spectrum,* October, 1980, pages 34–37. However, unlike prior echo canceler arrangements, canceler 100 includes energy discriminator 103 for controllably enabling updating of an echo signal estimate, in accordance with an aspect of the invention, when a far end signal received over a first transmission path includes a certain class of signals including so-called whole band energy. Stated another way, updating of the echo signal estimate is inhibited when the far end signal includes significant energy which is only partial band. Broadly, in one embodiment of the invention an average magnitude of the received signal is compared to a modified magnitude of the received signal and if the modified magnitude is greater than the average, the received signal is considered to include whole band energy. If so, the updating or adapting of the echo signal estimate is enabled. Otherwise, updating of the echo estimate is inhibited. This enables the echo canceler adapting to a transfer function only when the received signal includes whole band energy and inhibits updating the transfer function when only partial band energy is being received, which would result in possible low return loss for other frequency components in the frequency band of interest e.g., the voice frequency band. Consequently, unwanted oscillations and other problems in the transmission network are avoided.

Briefly, canceler 100 includes an adjustable signal processor having a closed loop error control system which is self-adapting in that it automatically tracks signal variation in an outgoing path. More specifically, canceler 100 employs echo estimator 101 including a transversal filter arrangement for synthesizing a linear approximation of the echo, i.e., an echo estimate.

To this end, far end incoming signal X(K) is usually supplied from a far end talking party over a first transmission path, e.g., lead 102, to a first input of echo canceler 100 and therein to an input of echo estimator 101, an input of energy discriminator 103 and a first input of speech detector 104. Far end signal X(K) may be, for example, a digitally sampled speech signal, where K is an integer identifying the sampling interval. Far end signal X(K) is also supplied via lead 105, perhaps through some conversion circuitry, e.g., an analog-to-digital converter not shown, to a first input of hybrid 106. It is usually desirable for the input signal to hybrid 106 from lead 105 to be supplied over bidirectional path 107 to a near listening party. However, because of an impedance mismatch in hybrid 106, typically caused by balance impedance 108 not exactly matching the impedance of bidirectional path 107 a portion of the hybrid input signal appears on outgoing lead 109 and is reflected to the far end signal source as an echo. The echo is supplied from an output of hybrid 106 over lead 109 to a second input of canceler 100 and therein to a second input of speech detector 104, and a first input of combining network 110. Lead 109 may also include conversion apparatus, e.g., an analog-to-digital converter not shown. A second input to combining network 110 is a signal estimate of the echo generated by echo estimator 101. The echo estimate is supplied via lead 111 from an output of echo estimator 101 to the second input of combining network 110. Combining network 110 generates error signal E(K) corresponding to the algebraic difference between the echo estimate and the output from hybrid 109 including the undesirable echo. Error signal E(K) is supplied over a second transmission path, e.g., lead 112 to the far end source and to controllable switching gate 113. Gate 113 is controlled to be enabled or inhibited by an output signal from AND gate 114. A first state of the output from AND gate 114, e.g., a logical 1 enables gate 114 to supply error signal E(K) to estimator 101 while a second state of the output from AND gate 114, e.g., a logical 0 inhibits gate 114 from supplying error signal E(K) to estimator 111.

Heretofore, gate 113 was controlled to inhibit supplying error signal E(K) to estimator 101 when significant far end energy was not present, when near end speech was present or when a prescribed relationship between error signal E(K), far end signal X(K) and a status signal indicates the presence of near end speech signals as described in U.S. Pat. No. 4,129,753. As indicated above far end signal X(K) could include speech, noise, any of a number of individual tones, multifrequency tones or the like. Thus, in prior arrangements error signal E(K) was only inhibited when no significant far end energy was detected or when near end speech was detected. On the otherhand, error signal E(K) was supplied to estimator 101 during intervals that significant far end energy in signal X(K) was detected. This energy could be partial band energy, i.e., a single frequency tone, multifrequency tones or the like. Consequently, estimator 101 was allowed to adapt or otherwise be adjusted during the intervals that only partial band energy was being received. As indicated above such an adjustment results in undesirable results. Specifically, the transfer function to which estimator 101 may adjust to for the frequency components of the partial band signal would possibly result in a low return loss for other frequency components in the frequency band of interest. This, in turn, may cause unwanted oscillations in the communications circuits. The undesirable oscillations and other problems arise from allowing estimator 101 to be adjusted when partial band energy is present are avoided, in accordance with an aspect of the invention, by employing energy discriminator 103 to distinguish whether far end signal X(K) includes only partial band energy or whole band energy. If it is determined that X(K) is not whole band energy, e.g., speech or noise, or stated another way, if X(K) is partial band energy, e.g., a single frequency tone, multifrequency tones or the like, discriminator 103 generates an output which inhibits AND gate 114. On the other hand, when whole band energy is detected, discriminator 103 generates an output which enables AND gate 114. AND gate 114, in turn, generates a control signal for controlling gate 113 and, hence, the supply of E(K) to estimator 101. Specifically, a first state of the control signal from gate 114, e.g., a logical 1 enables gate 113 while a second state of the control signal, e.g., a logical 0 inhibits gate 113. Consequently, the echo estimate generated by estimator 101 remains constant during intervals that only partial band energy is present and an undesirable adjustment of the canceler transfer function is avoided.

Estimator 101 includes a so-called tapped delay line comprised of delay units 115-1 through 115-N for realizing desired delays at the taps corresponding to convenient Nyquist intervals. Therefore, delayed replicas X(K-1) through X(K-N) of incoming far end signal X(K) are generated at the corresponding taps. The signal at each tap position, namely X(K-1) through X(K-N) as well as X(K), is adjusted in response to error signal E(K). More particularly, signals X(K) through X(K-N) are individually weighted in response to E(K) via a corresponding one of adjustment networks 116-0 through 116-N, respectively. Adjustment networks 116-0 through 116-N each include multipliers 117 and 118, and feedback loop 119. Feedback loop 119 adjusts the tap weight to a desired value in a manner which will be apparent to those skilled in the art and explained in the above-noted references. The weighted replicas of X(K) from adjustment networks 116-0 through 116-N are summed via summing network 120 to generate the echo estimate signal approximating the echo to be cancelled. The echo estimate is supplied via lead 111 to the second input of combining network 110.

Figure 2:
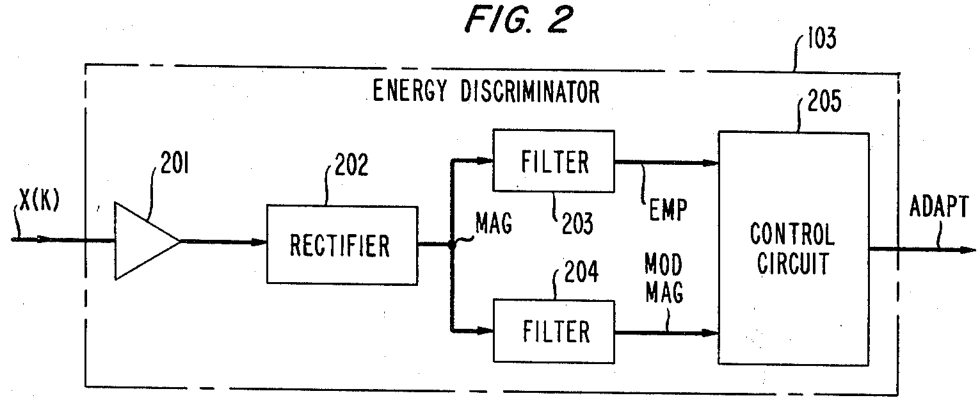
FIG. 2 depicts in simplified form details of the energy discriminator employed in FIG. 1.

FIG. 2 shows in simplified block diagram form one embodiment of energy discriminator 103 which may be utilized, in accordance with an aspect of the invention, to determine whether significant energy in received signal X(K) is whole band and, hence, not only partial band. In this example not to be construed as limiting the scope of the invention, the frequency band of interest is the telephone voice frequency band of approximately 300 Hz to 4000 Hz. Whole band energy is, for example, speech, Gaussian noise or the like, i.e., signals having frequency components across the whole frequency band. Partial band energy is, for example, single frequency tones, multifrequency tones or the like, i.e., signals having frequency components in relatively narrow frequency portions of the frequency band of interest.

Accordingly, received signal X(K) is supplied via buffer amplifier 201 to rectifier 202. Any one of a number of precision full wave rectifiers known in the art may be employed for this purpose. If X(K) is a digital signal, for example, representative of a $\mu$-law sample, a $\mu$-law to linear digital converter, not shown, would be used after rectifier 202. In this example, it is assumed that X(K) is an analog signal.

Rectified version MAG of X(K) is supplied to first filter 203 and to second filter 204. Filters 203 and 204 are employed to obtain prescribed characteristics of received signal X(K) in order to distinguish whether X(K) includes whole band energy or only partial band energy. In this example, filter 203 is used to obtain an average value of MAG while filter 204 is used to obtain a modified magnitude of MAG. To this end, filter 203 is a low pass filter having a first prescribed time constant while filter 204 has a second prescribed time constant. Since filter 204 in this example generates modified magnitude MOD MAG of MAG in accordance with a prescribed criterion, the second time constant is zero and filter 204 is essentially an attenuator. In this example, MOD MAG is 9 dB less than MAG, i.e., MOD MAG=MAG-9 dB.

Filter 203 generates essentially the running average of MAG and has a short time constant, illustratively on the order of 8 to 16 milliseconds. Specifically, filter 203 is an active resistor-capacitor (RC) filter (not shown) having a prescribed exponential characteristic to generate an exponentially mapped past (EMP) version of MAG. It is noted that other filter characteristics may be equally employed in obtaining the EMP of MAG. A variety of arrangements and techniques may be employed for generating the short term running average of signal MAG. As indicated above, one technique is to obtain the exponentially mapped past (EMP) of the signal. EMP averaging is particularly useful in control or detection situations where interest is directed at the recent past behavior of a process and is described in *IRE Transactions on Automatic Control*, Vol. AC-5, January 1960, pages 11-17. The EMP average of a continuous signal is determined by weighting the recent signal occurrence more heavily than the less recent signal occurrence. The relative weighting of a continuous signal is, for example, an exponential function.

Both signal EMP and signal MOD MAG are supplied to control circuit 205 for generating in accordance with prescribed criteria signal ADAPT. Signal ADAPT in this example is employed to control enabling and disabling AND gate 113 (FIG. 1) and, hence, enabling and disabling updating of the echo estimate being generated by echo estimator 101 (FIG. 1). Specifically, when ADAPT is a first state, e.g., a logical 1 signal X(K) includes whole band energy and when ADAPT is a second state, e.g., a logical 0 signal X(K) includes partial band energy.

Figure 3:
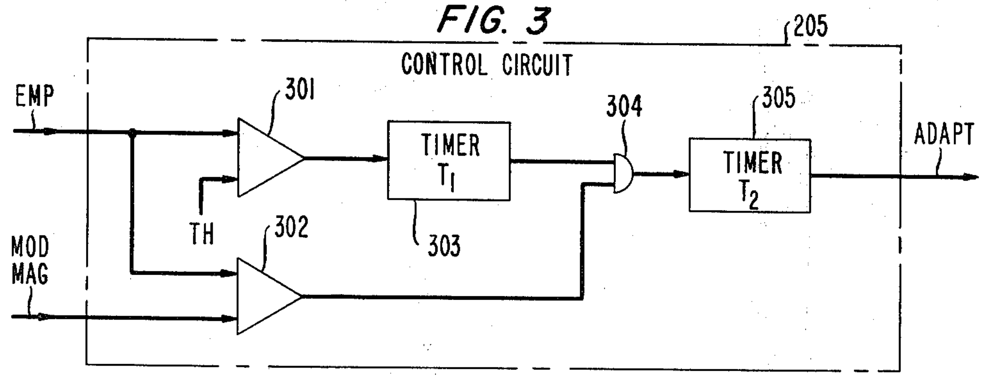
FIG. 3 shows details of the control circuit employed in the discriminator of FIG. 2.

FIG. 3 shows details of control circuit 205. Accordingly, EMP is supplied to a first input of comparators 301 and 302. MOD MAG is supplied to a second input of comparator 302 while signal TH is supplied to a second input of comparator 301. Comparator 301 is employed to detect whether received signal X(K) includes significant far end energy. Thus, if EMP exceeds a predetermined threshold TH, X(K) is assumed to include significant energy. In this example TH=50 dBmO. An output from comparator 301 is supplied to timer 303. Timer 303 is employed to determine whether the significant far end energy is present for at least a first predetermined interval $T_1$. In this example, timer 303 provides a wait interval of $T_1=24$ milliseconds. This is to protect against erroneously generating ADAPT=1 during the initial interval of received signal X(K) while filter 203 (FIG. 2) output is in a transient state. An output from timer 303 is supplied to a first input of AND gate 304. Thus, AND gate 304 is disabled until EMP is greater than TH for interval $T_1$.

Comparator 302 compares MOD MAG to EMP. When MOD MAG is greater than EMP comparator 302 generates a logical 1 output. An output from comparator 302 is supplied to a second input of AND gate 304. Thus, AND gate 302 is inhibited until MOD MAG is greater than EMP.

An output from AND gate 304 is supplied to timer 305. Timer 305 is responsive to a logical 1 from AND gate 304 to generate an ADAPT=1 output immediately and to generate the ADAPT=1 output for an additional second predetermined interval $T_2$ upon a transition from logical 1 to logical 0 output from AND gate 304. Interval $T_2$ is a so-called hangover interval and adds in this example, 24 milliseconds to the logical 1 output from AND gate 304. This generates ADAPT=1 for a sufficiently long interval for canceler 100 to update the echo estimate being generated.

Figure 4:
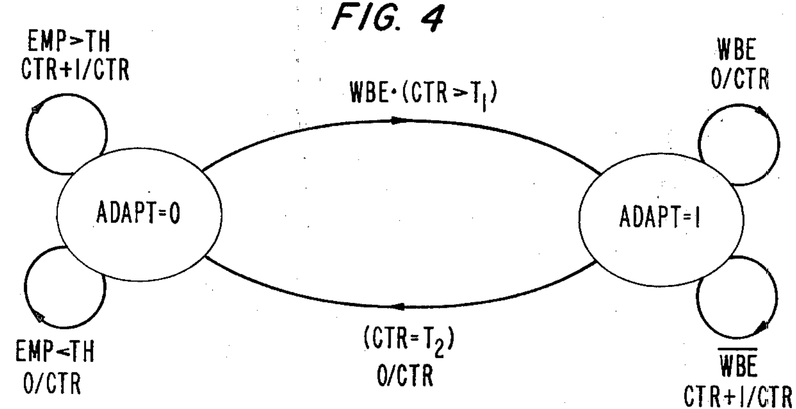
FIG. 4 is a state diagram useful in describing operation of the discriminator of FIG. 2 and control circuit of FIG. 3.

Operation of energy discriminator 103 is summarized in the state diagram shown in FIG. 4. Simply, ADAPT=0 until EMP>TH for $T_1$, and MOD MAG>EMP. When the above conditions are all met X(K) includes whole band energy and ADAPT=1 for an interval equal to at least interval $T_2$. To this end, if ADAPT=0 and EMP>TH a counter (CTR, not shown) in timer 303 (FIG. 3) is incremented, i.e., CTR+1/CTR. Also, if ADAPT=0 and EMP<TH the counter (CTR) in timer 303 (FIG. 3) is zeroed, i.e., 0/CTR. If ADAPT=0, EMP>TH, CTR>T, and MODMAG>EMP, then whole band energy (WBE) is detected and ADAPT switches to a logical 1. If ADAPT=1 and whole band energy is detected (WBE), then a counter (CTR not shown) in timer 305 is zeroed, i.e., 0/CTR. Also, if ADAPT=1 and whole band energy is not detected ($\overline{WBE}$), then the counter (CTR) in timer 305 is incremented, i.e., CTR+1/CTR. When interval $T_2$ is obtained, i.e., CTR=$T_2$, the counter (CTR) in timer 305 is zeroed, i.e., 0/CTR, and ADAPT switches to a logical 0.

Thus, it is seen that ADAPT=0 during intervals that EMP>TH but MOD MAG<EMP. When this occurs, the energy is partial band and updating of the echo estimate is inhibited.

What is claimed is:

1. An echo canceler of the type including, adjustable signal processing means coupled to a first transmission path for generating an echo estimate signal, means coupled to a second transmission path for combining a signal in the second path with the echo estimate signal to generate an error signal, means responsive to the error signal for adjusting the processing means, and means for controllably supplying the error signal to the adjusting means, the echo canceler, CHARACTERIZED BY, means for discriminating between whole band energy and partial band energy in a received signal in the first transmission path and for generating a control signal indicative thereof, said discriminating means including means for generating a first signal representative of an average value of the received signal, means for generating a second signal representative of a magnitude of the received signal, and means for comparing said first and second signals to generate a first state of said control signal when said second signal is greater than said first signal, said control signal being supplied to the controllable supplying means for enabling supplying the error signal to the adjusting means during intervals that said control signal first state is generated.

2. An echo canceler as defined in claim 1 wherein said second signal is a modified magnitude version of the received signal generated by said second signal generating means in accordance with a prescribed criterion.

3. An echo canceler as defined in claim 1 wherein said second signal generating means comprises a filter having a substantially zero time constant for generating a modified magnitude signal in a prescribed relationship to the magnitude of the received signal.

4. An echo canceler as defined in claim 1 wherein said first signal generating means comprises a first filter for generating a short term running average value of the received signal.

5. An echo canceler as defined in claim 4 wherein said first filter is a low pass filter having a predetermined time constant.

6. An echo canceler as defined in claim 4 wherein said first filter is a low pass filter having a prescribed exponential characteristic for generating an exponentially mapped past average value of the received signal.

7. An echo canceler as defined in claim 6 wherein said second signal generating means comprises a second filter having a predetermined time constant for attenuating said magnitude of the received signal by a predetermined amount.

8. An echo canceler as defined in claim 7 wherein said discriminating means further includes means for generating said first state of the control signal for at least a predetermined interval.

9. An echo canceler as defined in claim 8 wherein said discriminating means further includes means for inhibiting generation of said control signal first state until said first signal has a magnitude which exceeds a predetermined threshold level for a predetermined interval.

10. An echo canceler as defined in claim 7 wherein said second filter time constant is substantially zero.

* * * * *